(12) United States Patent
Awano et al.

(10) Patent No.: US 10,142,866 B2
(45) Date of Patent: Nov. 27, 2018

(54) MOBILE TERMINAL TESTING APPARATUS AND LOCAL OSCILLATION FREQUENCY DETECTION METHOD FOR MOBILE TERMINAL TESTING APPARATUS

(71) Applicant: ANRITSU CORPORATION, Kanagawa (JP)

(72) Inventors: Takayuki Awano, Kanagawa (JP); Yoshitaka Kihara, Kanagawa (JP); Naoki Inoue, Kanagawa (JP); Paulo-Jessie Morales, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 72 days.

(21) Appl. No.: 15/278,463

(22) Filed: Sep. 28, 2016

(65) Prior Publication Data
US 2017/0099609 A1  Apr. 6, 2017

(30) Foreign Application Priority Data
Oct. 2, 2015  (JP) .................... 2015-196823

(51) Int. Cl.
*H04W 24/06* (2009.01)
*H04L 5/00* (2006.01)

(52) U.S. Cl.
CPC ............. *H04W 24/06* (2013.01); *H04L 5/001* (2013.01); *H04L 5/0039* (2013.01)

(58) Field of Classification Search
CPC ..... H04W 24/02; H04W 24/04; H04W 24/06; H04W 24/08
See application file for complete search history.

(56) References Cited

U.S. PATENT DOCUMENTS

| | | | |
|---|---|---|---|
| 9,577,798 B1* | 2/2017 | Melis | H04L 5/0005 |
| 2011/0183637 A1* | 7/2011 | Flickinger | H04B 17/0085 |
| | | | 455/150.1 |
| 2013/0064117 A1* | 3/2013 | Hashimoto | H04W 24/06 |
| | | | 370/252 |
| 2013/0100925 A1* | 4/2013 | Ahn | H04L 5/001 |
| | | | 370/329 |
| 2014/0080424 A1* | 3/2014 | Aoki | H04W 24/06 |
| | | | 455/67.14 |
| 2014/0269527 A1* | 9/2014 | Asokan | H04L 5/001 |
| | | | 370/329 |
| 2015/0162881 A1* | 6/2015 | Hammi | H03F 3/189 |
| | | | 330/291 |

(Continued)

FOREIGN PATENT DOCUMENTS

JP    2014-027656 A    2/2014

*Primary Examiner* — Redentor Pasia
(74) *Attorney, Agent, or Firm* — Pearne & Gordon LLP (57) ABSTRACT

In a case where testing of uplink carrier aggregation that is a frequency arrangement in which a primary component carrier and a secondary component carrier are contiguous is performed, a control unit 15 causes a call processing unit 12 to configure a transmission signal of a mobile terminal 2 in such a manner that the transmission signal satisfies a prescribed condition for user data transmission, and causes a wireless signal measurement unit 13 to detect a local oscillation frequency from a band that includes a frequency band in which a primary component carrier and a secondary component carrier are contiguous, using a reception signal that satisfies the prescribed condition for user data transmission.

6 Claims, 8 Drawing Sheets

(56) References Cited

U.S. PATENT DOCUMENTS

| | | | |
|---|---|---|---|
| 2015/0180596 A1* | 6/2015 | Berg | H04B 3/46 375/224 |
| 2015/0264591 A1* | 9/2015 | Baeder | H04W 24/08 370/252 |
| 2016/0254871 A1* | 9/2016 | Russ | H04B 17/29 455/67.14 |

* cited by examiner

MOBILE TERMINAL TESTING APPARATUS AND LOCAL OSCILLATION FREQUENCY DETECTION METHOD FOR MOBILE TERMINAL TESTING APPARATUS

TECHNICAL FIELD

The present invention relates to a mobile terminal testing apparatus that performs testing of a mobile communication terminal.

BACKGROUND ART

In a case where mobile communication terminals such as a portable telephone and a data communication terminal are developed, there is a need to test whether or not these developed mobile communication terminals perform communication normally. For this reason, a mobile communication terminal that is a testing target is connected to a testing apparatus that operates as a pseudo-base station that has a functional resemblance to an actual base station, and communication is performed between the testing apparatus and the mobile communication terminal. Thus, testing is performed for checking contents of the communication.

Furthermore, in the 3rd Generation Partnership Project (3GPP) in which wireless communication standards are created, among standards for Long Term Evolution-Advanced (LTE-A), a carrier aggregation technology is introduced. This carrier aggregation achieves improvement in transfer speed by performing communication using multiple LTE carriers at the same time.

In the carrier aggregation, communication is performed using multiple LTE carriers, each of which is referred to as a component carrier (which is hereinafter referred to as a CC), and the carrier aggregation is categorized by an arrangement of frequencies of each CC into three types, that is, intra-band contiguous CA (carrier aggregation using multiple CCs in which contiguous frequencies are arranged), intra-band non-contiguous CA (carrier aggregation using multiple CCs in which non-contiguous frequencies are arranged in the same frequency band), and inter-band CA (carrier aggregation using multiple CCs in which non-contiguous frequencies are arranged in different frequency bands).

In the carrier aggregation, the communication is performed with one primary component carrier (which is hereinafter referred to as a PCC) that is a CC necessary for the mobile communication terminal to maintain a connection to a base station, and one or more secondary component carriers (each of which is referred to as an SCC) that are used to improve a speed of transfer between the mobile communication terminal and the base station.

A testing apparatus that is capable of performing carrier aggregation testing is disclosed in Patent Document 1.

RELATED ART DOCUMENT

Patent Document

[Patent Document 1] JP-A-2014-27656

DISCLOSURE OF THE INVENTION

Problem that the Invention is to Solve

Standards in 3GPP Release 10 or later require that a carrier aggregation technology be also applied to uplink (a link from the mobile communication terminal to the base station).

Standards in 3GPP stipulates measurement items for a transmission signal of the mobile communication terminal, and when it comes to the following measurement items for the intra-band contiguous CA, if a position of a frequency of a local oscillator (which is referred to as an "LO frequency") of the mobile communication terminal on the testing apparatus side is not known, precise measurement cannot be performed.

Error Vector Magnitude (EVM) for CA (TS36.521-1 6.5.2A.1)

Carrier leakage for CA (TS36.521-1 6.5.2A.2)

In-band emissions for non allocated RB for CA (TS36.521-1 6.5.2A.3)

Because the LO frequency depends on specifications for or a hardware constitution of the mobile communication terminal, in a testing apparatus that is proposed in Patent Document 1, when a user of the testing apparatus does not know the specifications for or the hardware constitution of the mobile communication terminal, this means that the user does not know the LO frequency. Thus, the precise measurement cannot be performed.

Accordingly, an object of the present invention is to provide a mobile terminal testing apparatus that, although specifications for or a hardware constitution of a mobile communication terminal is not known, is capable of precisely performing measurement of a transmission signal of the mobile communication terminal.

Means for Solving the Problem

According to a first aspect of the present invention, there is provided a mobile terminal testing apparatus (1) that, based on a parameter that is configured for each of multiple component carriers in carrier aggregation, sets one of the multiple component carriers to be a primary component carrier, sets the other component carriers to be a secondary component carrier, makes a call connection to a mobile terminal (2), and thus performs testing of the carrier aggregation, the mobile terminal testing apparatus including: a call processing unit that makes the call connection between the mobile terminal testing apparatus itself and the mobile terminal and thus controls a condition for transmitting a transmission signal of the mobile terminal; a wireless signal measurement unit that receives from the mobile terminal a signal which is set to be a prescribed transmission condition and that detects a local oscillation frequency of the mobile terminal from the received signal; and a control unit that controls operation of each of the call processing unit and the wireless signal measurement unit, in which, in a case where testing of uplink carrier aggregation that is a frequency arrangement in which a primary component carrier and a secondary component carrier in uplink are contiguous is performed, based on an instruction from the control unit, the call processing unit performs configuration for the mobile terminal in such a manner that the signal which is transmitted by the mobile terminal to the wireless signal measurement unit is set to be the prescribed transmission condition, and the wireless signal measurement unit detects the local oscillation frequency from a frequency band in which the primary component carrier and the secondary component carrier in the uplink are contiguous, using the signal that is set to be the prescribed transmission condition, which is received from the mobile terminal.

With this constitution, the signal that satisfies the prescribed transmission condition is transmitted from the mobile terminal, and the local oscillation frequency is detected from the received signal that satisfies the prescribed transmission signal. For this reason, although specifications for or a hardware constitution of the mobile terminal is not known, measurement of the transmission signal of the mobile terminal can be precisely performed.

Furthermore, according to a second aspect of the present invention, in the mobile terminal testing apparatus according to the first aspect, the call processing unit performs configuration for the mobile terminal in such a manner that the mobile terminal is in a state of not transmitting user data, and in which the wireless signal measurement unit receives a spurious as the signal from the mobile terminal and detects the local oscillation frequency from the frequency band in which the primary component carrier and the secondary component carrier in the uplink are contiguous.

With this constitution, the spurious is transmitted, as the signal that satisfies the prescribed transmission condition, from the mobile terminal, and the local oscillation frequency is detected from the received spurious. For this reason, although the specifications for or the hardware constitution of the mobile terminal is not known, the measurement of the transmission signal of the mobile terminal can be precisely performed.

Furthermore, according to a third aspect of the present invention, in the mobile terminal testing apparatus according to the second aspect, the wireless signal measurement unit sets a maximum-power frequency point in the frequency band in which the primary component carrier and the secondary component carrier in the uplink are contiguous, to be the local oscillation frequency.

With this constitution, the spurious is received, as the signal that satisfies the prescribed transmission condition, from the mobile terminal, and the maximum-power frequency point for the signal is set to be the local oscillation frequency. For this reason, although the specifications for or the hardware constitution of the mobile terminal is not known, the measurement of the transmission signal of the mobile terminal can be precisely performed.

Furthermore, according to a fourth embodiment of the present invention, in the mobile terminal testing apparatus according to the third aspect, in a case where one frequency point is present in every band of each component carrier, the wireless signal measurement unit sets each of the frequency points to be the local oscillation frequency of each component carrier.

With this constitution, in a case where one maximum-power frequency point is present in every band of each component carrier, each of the frequency points is set to be the local oscillation frequency of each component carrier. For this reason, although the specifications for or the hardware constitution of the mobile terminal is not known, the measurement of the transmission signal of the mobile terminal can be precisely performed.

Furthermore, according to a fifth aspect of the present invention, in the mobile terminal testing apparatus according to the first aspect, the call processing unit performs configuration for the mobile terminal in such a manner that the mobile terminal is caused to transmit the user data and thus a state is provided where the user data is caused to have a deviation in a transmission spectrum, and in which the wireless signal measurement unit detects a transmission signal for the user data transmitted by the mobile terminal and an image signal for the transmission signal, which are in the frequency band in which the primary component carrier and the secondary component carrier in the uplink are contiguous, and sets a maximum-power frequency point that is midway between the transmission signal and the image signal, to be the local oscillation frequency.

With this configuration, the signal of which the user data has the deviation in the transmission spectrum is transmitted, the transmission signal of the mobile terminal and the image signal for the transmission signal are detected from the received signal, and the maximum-power frequency point that is midway between the transmission signal and the image signal is set to be the local oscillation frequency. For this reason, although the specifications for or the hardware constitution of the mobile terminal is not known, the measurement of the transmission signal of the mobile terminal can be precisely performed.

Furthermore, according to a sixth aspect of the present invention, in the mobile terminal testing apparatus according to the first aspect, the call processing unit performs configuration for the mobile terminal in such a manner that the mobile terminal is caused to transmit the user data and thus a state is provided where the user data is caused to have a deviation in a transmission spectrum, and in which the wireless signal measurement unit detects a transmission signal for the user data transmitted by the mobile terminal and an image signal for the transmission signal, which are in the frequency band in which the primary component carrier and the secondary component carrier in the uplink are contiguous, and, in a case where the detected maximum-power frequency point is in the vicinity of a center frequency of the primary component carrier, estimates that the local oscillation frequency is present in the center frequency of the primary component carrier and in a center frequency of the secondary component carrier.

With this configuration, the signal of which the user data has the deviation in the transmission spectrum is transmitted, the transmission signal of the mobile terminal and the image signal for the transmission signal are detected from the received signal, and, in the case where the detected maximum-power frequency point is in the vicinity of the center frequency of the primary component carrier, it is estimated that the local oscillation frequency is present in the center frequency of each of the primary component carrier and the secondary component carrier. For this reason, although the specifications for or the hardware constitution of the mobile terminal is not known, the measurement of the transmission signal of the mobile terminal can be precisely performed.

Furthermore, according to a seventh aspect of the present invention, in the mobile terminal testing apparatus according to the first aspect, the call processing unit performs configuration for the mobile terminal in such a manner that the mobile terminal is caused to transmit the user data and thus a state is provided where the user data is caused to have a deviation in a transmission spectrum, and in which the wireless signal measurement unit detects a transmission signal for the user data transmitted by the mobile terminal and an image signal for the transmission signal, which are in the frequency band in which the primary component carrier and the secondary component carrier in the uplink are contiguous, and, in a case where the detected maximum-power frequency point is present in a frequency domain of a guard band between the primary component carrier and the secondary component carrier, estimates that the local oscillation frequency is present in the guard band.

With this configuration, the signal of which the user data has the deviation in the transmission spectrum is transmitted, the transmission signal of the mobile terminal and the image signal for the transmission signal are detected from the received signal, and in the case where the detected maximum-power frequency point is present in the frequency domain of the guard band between the primary component carrier and the secondary component carrier, it is estimated that the local oscillation frequency is present in the guard band. For this reason, although the specifications for or the hardware constitution of the mobile terminal is not known, the measurement of the transmission signal of the mobile terminal can be precisely performed.

Furthermore, according to an eighth aspect of the present invention, in the mobile terminal testing apparatus according to the first aspect, the wireless signal measurement unit further measures prescribed performance of the uplink carrier aggregation that is the frequency arrangement in which the primary component carrier and the secondary component carrier in the uplink are contiguous, using information on a position of the detected local oscillation frequency.

With this constitution, the prescribed performance of the uplink carrier aggregation that is the frequency arrangement in which the primary component carrier and the secondary component carrier in the uplink are contiguous is further measured using the information on the position of the detected local oscillation frequency. For this reason, although the specifications for or the hardware constitution of the mobile terminal is not known, the measurement of the transmission signal of the mobile terminal can be precisely performed.

Furthermore, according to a ninth aspect of the present invention, there is provided a local oscillation frequency detection method for a mobile terminal testing apparatus, which is performed by the mobile terminal testing apparatus that, based on a parameter that is configured for each of multiple component carriers in carrier aggregation, sets one of the multiple component carriers to be a primary component carrier, sets the other component carriers to be a secondary component carrier, makes a call connection to a mobile terminal, and thus performs testing of the carrier aggregation, the method: configuring the mobile terminal in such a manner that a transmission signal from the mobile terminal is set to be a prescribed transmission condition, with call control between the mobile terminal testing apparatus itself and the mobile terminal; and detecting a local oscillation frequency of the mobile terminal from a frequency band in which a primary component carrier and a secondary component carrier in uplink are contiguous, wherein the configuring of the mobile terminal and the detection of the local oscillation frequency are performed in a case where testing of uplink carrier aggregation that is a frequency arrangement in which a primary component carrier and a secondary component carrier in the uplink are contiguous is performed.

With this constitution, the signal that satisfies the prescribed transmission condition is transmitted from the mobile terminal, and the local oscillation frequency is detected from the received signal that satisfies the prescribed transmission signal. For this reason, although the specifications for or the hardware constitution of the mobile terminal is not known, the measurement of the transmission signal of the mobile terminal can be precisely performed.

Furthermore, according to a tenth aspect of the present invention, in the local oscillation frequency detection method for a mobile terminal testing apparatus according to the ninth aspect, in the configuring of the mobile terminal, the mobile terminal is configured to be in a state of not transmitting user data, and in which, in the detecting of the local oscillation frequency, a local oscillation frequency of the mobile terminal is detected from the frequency band in which the primary component carrier and the secondary component carrier in the uplink are contiguous, using a spurious that is received from the mobile terminal.

With this constitution, the spurious is transmitted, as the signal that satisfies the prescribed transmission condition, from the mobile terminal, and the local oscillation frequency is detected from the received spurious. For this reason, although the specifications for or the hardware constitution of the mobile terminal is not known, the measurement of the transmission signal of the mobile terminal can be precisely performed.

Furthermore, according to an eleventh aspect of the present invention, in the local oscillation frequency detection method for a mobile terminal testing apparatus according to the tenth aspect, in the detecting of the local oscillation frequency, a maximum-power frequency point in the frequency band in which the primary component carrier and the secondary component carrier in the uplink are contiguous is detected as the local oscillation frequency.

With this constitution, the spurious is received, as the signal that satisfies the prescribed transmission condition, from the mobile terminal, and the maximum-power frequency point for the signal is set to be the local oscillation frequency. For this reason, although the specifications for or the hardware constitution of the mobile terminal is not known, the measurement of the transmission signal of the mobile terminal can be precisely performed.

Furthermore, according to a twelfth aspect of the present invention, in the local oscillation frequency detection method for a mobile terminal testing apparatus according to the eleventh aspect, in the detecting of the local oscillation frequency, in a case where one frequency point is present in every band of each component carrier, each of the frequency points is detected as the local oscillation frequency of each component carrier.

With this constitution, in a case where one maximum-power frequency point is present in every band of each component carrier, each of the frequency points is set to be the local oscillation frequency of each component carrier. For this reason, although the specifications for or the hardware constitution of the mobile terminal is not known, the measurement of the transmission signal of the mobile terminal can be precisely performed.

Furthermore, according to a thirteenth aspect of the present invention, in the local oscillation frequency detection method for a mobile terminal testing apparatus according to the ninth aspect, in the configuring of the mobile terminal, the mobile terminal is configured in such a manner that the mobile terminal is caused to transmit the user data and thus a state is provided where the user data is caused to have a deviation in a transmission spectrum, and in which, in the detecting of the local oscillation frequency, a transmission signal for the user data transmitted by the mobile terminal and an image signal for the transmission signal, which are in the frequency band in which the primary component carrier and the secondary component carrier in the uplink are contiguous are detected, and a maximum-power frequency point that is midway between the transmission signal and the image signal is set to be the local oscillation frequency.

With this configuration, the signal of which the user data has the deviation in the transmission spectrum is transmitted, the transmission signal of the mobile terminal and the image signal for the transmission signal are detected from the received signal, and the maximum-power frequency point that is midway between the transmission signal and the image signal is set to be the local oscillation frequency. For this reason, although the specifications for or the hardware constitution of the mobile terminal is not known, the measurement of the transmission signal of the mobile terminal can be precisely performed.

Furthermore, according to a fourteenth aspect of the present invention, in the local oscillation frequency detection method for a mobile terminal testing apparatus according to the ninth aspect, in the configuring of the mobile terminal, the mobile terminal is configured in such a manner that the mobile terminal is caused to transmit the user data and thus a state is provided where the user data is caused to have a deviation in a transmission spectrum, and in which, in the detecting of the local oscillation frequency, a transmission signal for the user data transmitted by the mobile terminal and an image signal for the transmission signal, which are in the frequency band in which the primary component carrier and the secondary component carrier in the uplink are contiguous are detected, and, in a case where the detected maximum-power frequency point is in the vicinity of a center frequency of the primary component carrier, it is estimated that the local oscillation frequency is present in the center frequency of the primary component carrier and in a center frequency of the secondary component carrier.

With this configuration, the signal of which the user data has the deviation in the transmission spectrum is transmitted, the transmission signal of the mobile terminal and the image signal for the transmission signal are detected from the received signal, and in the case where the detected maximum-power frequency point is in the vicinity of the center frequency of the primary component carrier, it is estimated that the local oscillation is present in the center frequency of each of the primary component carrier and the secondary component carrier. For this reason, although the specifications for or the hardware constitution of the mobile terminal is not known, the measurement of the transmission signal of the mobile terminal can be precisely performed.

Furthermore, according to a fifteenth aspect of the present invention, in the local oscillation frequency detection method for a mobile terminal testing apparatus according to the ninth aspect, in the configuring of the mobile terminal, the mobile terminal is configured in such a manner that the mobile terminal is caused to transmit the user data and thus a state is provided where the user data is caused to have a deviation in a transmission spectrum, and in which, in the detecting of the local oscillation frequency, a transmission signal for the user data transmitted by the mobile terminal and an image signal for the transmission signal, which are in the frequency band in which the primary component carrier and the secondary component carrier in the uplink are contiguous are detected, and, in a case where the detected maximum-power frequency point is present in a frequency domain of a guard band between the primary component carrier and the secondary component carrier, it is estimated that the local oscillation frequency is present in the guard band.

With this configuration, the signal of which the user data has the deviation in the transmission spectrum is transmitted, the transmission signal of the mobile terminal and the image signal for the transmission signal are detected from the received signal, and in the case where the detected maximum-power frequency point is present in the frequency domain of the guard band between the primary component carrier and the secondary component carrier, it is estimated that the local oscillation frequency is present in the guard band. For this reason, although the specifications for or the hardware constitution of the mobile terminal is not known, the measurement of the transmission signal of the mobile terminal can be precisely performed.

Furthermore, according to a sixteenth aspect of the present invention, in the local oscillation frequency detection method for a mobile terminal testing apparatus according to the ninth aspect, further including measuring prescribed performance of the uplink carrier aggregation that is the frequency arrangement in which the primary component carrier and the secondary component carrier in the uplink are contiguous, using information on a position of the local oscillation frequency that is detected in the detection of the local oscillation frequency.

With this constitution, the prescribed performance of the uplink carrier aggregation that is the frequency arrangement in which the primary component carrier and the secondary component carrier in the uplink are contiguous is further measured using the information on the position of the detected local oscillation frequency. For this reason, although the specifications for or the hardware constitution of the mobile terminal is not known, the measurement of the transmission signal of the mobile terminal can be precisely performed.

Advantage of the Invention

According to the present invention, a mobile terminal testing apparatus can be provided that, although specifications for or a hardware constitution of a mobile communication terminal is not known, can precisely perform measurement of a transmission signal of the mobile communication terminal.

BRIEF DESCRIPTION OF THE DRAWINGS

FIG. 2 is a diagram illustrating an example of a position of an LO frequency of the mobile terminal in uplink carrier aggregation of the mobile terminal testing apparatus according to one embodiment of the present invention.

BEST MODE FOR CARRYING OUT THE INVENTION

A mobile terminal testing apparatus according to an embodiment of the present invention will be described below referring to the drawings.

Figure 1:
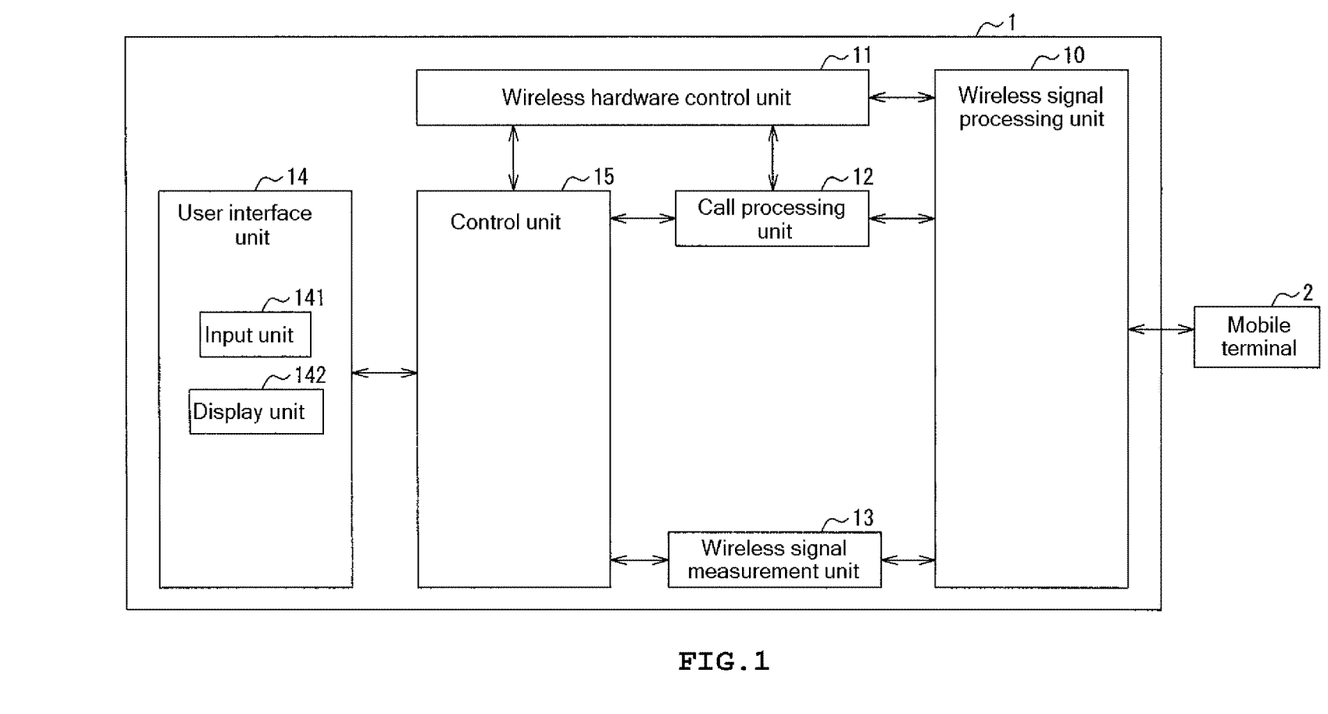
FIG. 1 is a conceptual block diagram of a mobile terminal testing apparatus according to one embodiment of the present invention.

In FIG. 1, a mobile terminal testing apparatus 1 according to one embodiment of the present invention is set to transmit and receive a radio signal to and from a mobile terminal 2 in a wired manner through a coaxial cable or the like, as a pseudo-base station. Moreover, the mobile terminal testing apparatus 1 may be set to transmit and receive a signal to and from the mobile terminal 2 in a wireless manner through an antenna. The mobile terminal testing apparatus 1 supports LTE-A standards, and is set to be enabled to perform communication between the mobile terminal testing apparatus 1 itself and the mobile terminal 2, using a carrier aggregation technology.

The mobile terminal testing apparatus 1 is configured to include a wireless signal processing unit 10, a wireless hardware control unit 11, a call processing unit 12, a wireless signal measurement unit 13, a user interface unit 14, and a control unit 15.

The wireless signal processing unit 10 transmits and receives a wireless signal between the wireless signal processing unit 10 itself and the mobile terminal 2. The wireless signal processing unit 10 performs coding, modulation, frequency conversion, and the like on transmission data of each of the call processing unit 12 and the wireless signal measurement unit 13 to generate a wireless signal, and transmits the generated wireless signal. Furthermore, the wireless signal processing unit 10 performs frequency conversion, demodulation, decoding, and the like on the wireless signal that is received from the mobile terminal 2, and outputs the result to each of the call processing units 12 and the wireless signal measurement unit 13.

The wireless hardware control unit 11 controls the wireless signal processing unit 10, and thus controls a transmission and reception level, a frequency, or the like of a wireless signal.

The call processing unit 12 is connected to the wireless signal processing unit 10 and the wireless hardware control unit 11. The call processing unit transmits a configuration signal to the wireless hardware control unit 11 in accordance with a parameter for a component carrier, such as a frequency or a multiplexing scheme, which is configured according to a testing condition, and transmits a wireless signal suitable for the testing condition to the wireless signal processing unit 10. Furthermore, the call processing unit 12 transmits and receives a wireless signal between the mobile terminal testing apparatus 1 itself and the mobile terminal 2 through the wireless signal processing unit 10, and makes a call connection suitable for the testing condition as a component carrier between the mobile terminal testing apparatus 1 itself and the mobile terminal 2 or performs a call control as a component carrier that corresponds to the testing condition. Furthermore, the call processing unit 12 transmits the configuration signal to the wireless signal processing unit 10 in accordance with the parameter, such as the multiplexing scheme, which is configured, and thus transmits the wireless signal suitable for the testing condition to the wireless signal processing unit 10.

The wireless signal measurement unit 13 is connected to the wireless signal processing unit 10. The wireless signal measurement unit 13 is set to measure a transmission and reception level, throughput, or the like of a wireless signal that is transmitted and received by the wireless signal processing unit 10, and is set to output a result of the measurement to the control unit 15. The control unit 15 stores the result of the measurement by the wireless signal measurement unit 13 in a hard disk or the like, in a state of being associated with time information. At the request of a user, the control unit 15 is set to output the result of the measurement to the user interface unit 14 for display, or is set to output the result of the measurement, as a log, to a file.

The user interface unit 14 includes an input unit 141 that receives an operation input from the user, and a display unit 142 on which a screen for configuring the parameter for the CC, the result of the measurement by the wireless signal measurement unit 13, or the like is displayed. The input unit 141 is constituted as a touchpad, a keyboard, a push button, or the like. The display unit 142 is configured as a liquid crystal display device or the like.

The control unit 15 is constituted as a computer unit that includes a central processing unit (CPU), a random access memory (RAM), a read only memory (ROM), a hard disk drive, and input and output ports, which are not illustrated. Along with various control constants, various maps, or the like, a program for causing the computer unit to function as the control unit 15 are stored in the ROM and the hard disk drive of the computer unit. That is, the CPU executes the program that is stored in the ROM and the hard disk device, and thus the computer unit functions as the control unit 15.

The wireless hardware control unit 11, the call processing unit 12, the wireless signal measurement unit 13, and the user interface unit 14 are connected to the input and output ports of the control unit 15, respectively.

Moreover, according to the present embodiment, the wireless hardware control unit 11, the call processing unit 12, and the wireless signal measurement unit 13 are constituted as a processor, such as a digital signal processor (DSP), which is programmed to perform each processing operation. Furthermore, the wireless signal processing unit 10 is constituted as a communication module.

Based on a parameter that is configured with an input operation of the input unit 141 in accordance with a parameter configuration screen that is displayed on the display unit 142, the control unit 15 transmits a configuration signal to the wireless hardware control unit 11, controls a frequency or a multiplexing scheme for a wireless signal that is transmitted and received by the wireless signal processing unit 10, and thus the wireless signal measurement unit 13 is caused to perform measurement. Furthermore, the control unit 15 notifies the call processing unit 12 of the configured parameter, and thus establishes communication over a component carrier suitable for the configured parameter.

Furthermore, in accordance with an instruction that is input into the input unit 141, the control unit 15 transmits a signal to the wireless hardware control unit 11 and the call processing unit 12 and is set to perform call control for testing.

In the mobile terminal testing apparatus 1, if a position of an LO frequency (local oscillation frequency) of the mobile terminal 2 on the mobile terminal testing apparatus 1 side is not known when it comes to a measurement item for an intra-band contiguous CA in transmission testing of the mobile terminal 2, precise measurement cannot be performed.

Figure 2A:
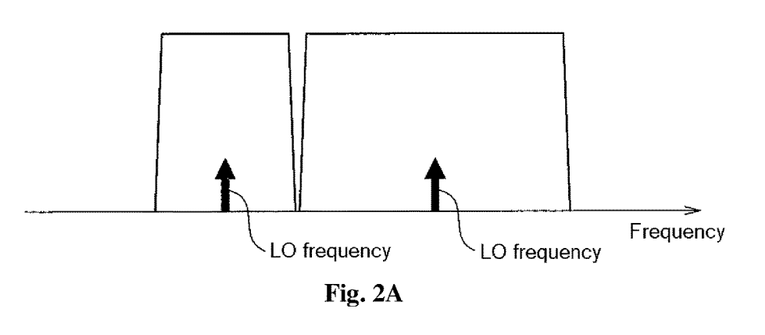
FIG. 2A is a diagram illustrating a case where the LO frequency is retained in each of a PCC and an SCC.
Figure 2B:
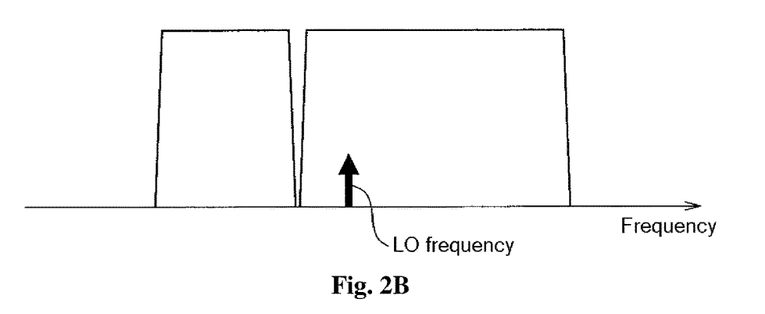
FIG. 2B is a diagram illustrating a case where the LO frequency is retained in the center of a frequency band in which the PCC and the SCC are contiguous.
Figure 2C:
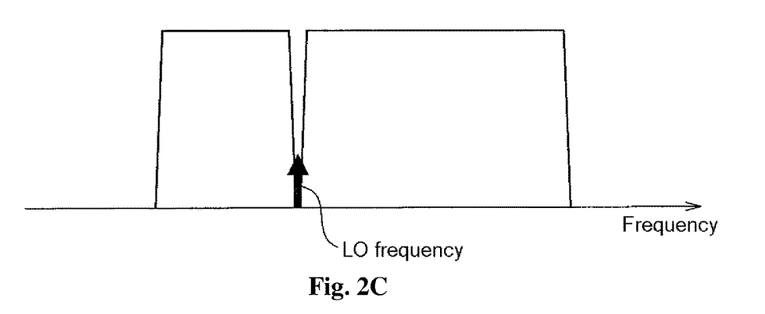
FIG. 2C is a diagram illustrating a case where the LO frequency is retained in a guard band between the PCC and the SCC.

As illustrated in FIGS. 2A, 2B and 2C, several positions of the LO frequency for the intra-band contiguous CA of the mobile terminal 2, which corresponds to an uplink carrier aggregation, are considered.

FIG. 2A illustrates a case where the LO frequency is retained in each of a PCC and a SCC. FIG. 2B illustrates a case where the LO frequency is retained in the center of a frequency band in which the PCC and SCC are contiguous. FIG. 2C illustrates a case where the LO frequency is retained in a guard band between the PCC and SCC.

Because which of these positions the mobile terminal 2 retains the LO frequency in depends on specifications of or a hardware constitution of the mobile terminal 2, in some cases, this cannot be easily known.

Accordingly, in a case where the transmission testing of the mobile terminal 2 is performed, the control unit 15 causes the wireless signal measurement unit 13 to detect the position of the LO frequency of the mobile terminal 2 before starting the measurement.

The control unit 15 causes the call processing unit 12 to establish a connection for the intra-band contiguous CA in uplink between the mobile terminal testing apparatus 1 and the mobile terminal 2. The control unit 15 causes the call processing unit 12 to transmit a prescribed control signal to the mobile terminal 2 and thus causes the mobile terminal 2 to be in a state where a user data of an uplink signal is not transmitted. In this state, the control unit 15 causes the wireless signal measurement unit 13 to detect the LO frequency.

The wireless signal measurement unit 13 creates a frequency spectrum in a frequency band in which the intra-band contiguous CAs are contiguous, and sets a maximum-power frequency point in the created frequency spectrum to be an LO frequency.

In a case where one maximum-power frequency point is present for each CC in the uplink carrier aggregation, the wireless signal measurement unit 13 sets each frequency point to be an LO frequency of each CC.

Figure 3:
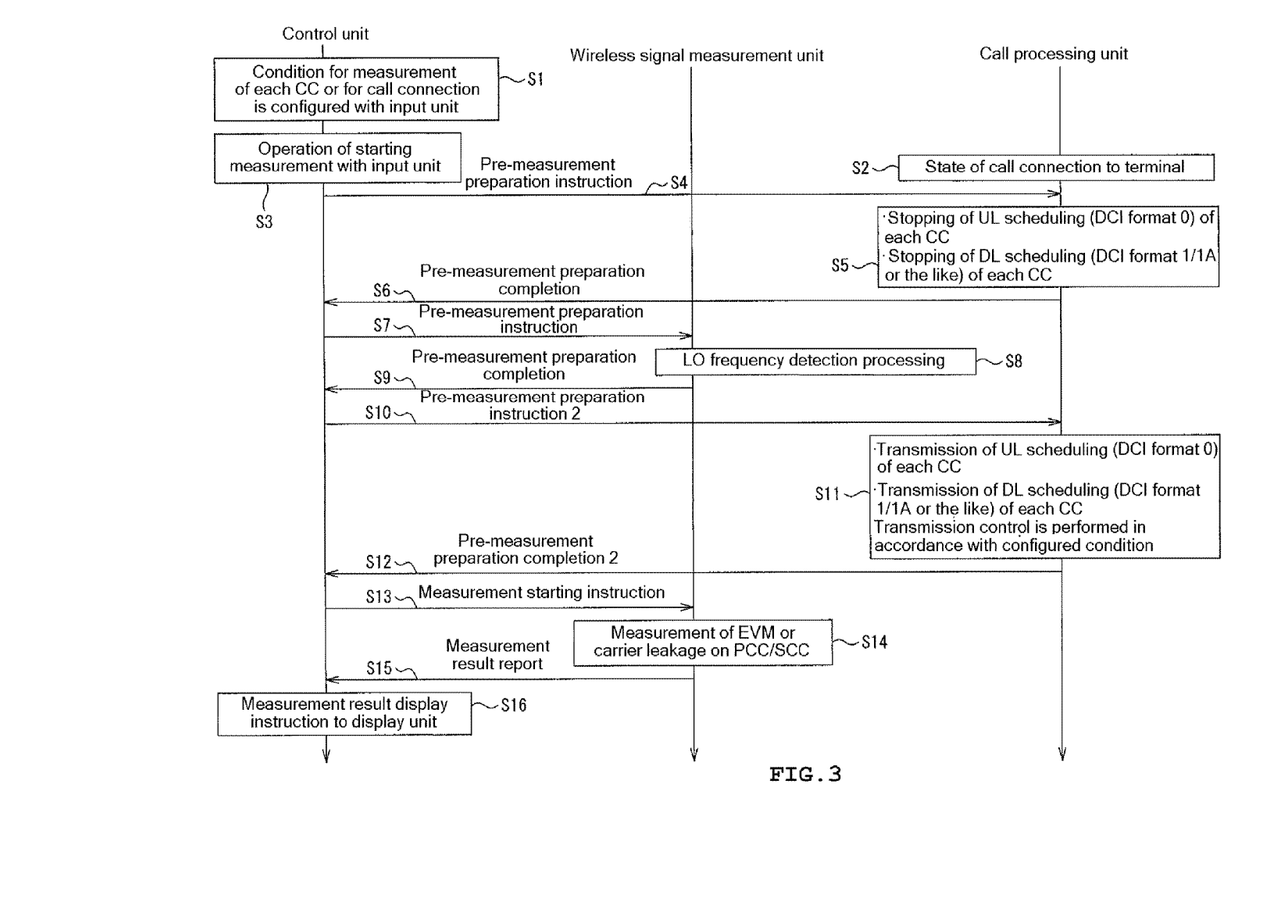
FIG. 3 is a sequence diagram illustrating a testing procedure for the uplink carrier aggregation of the mobile terminal testing apparatus according to one embodiment of the present invention.

A procedure in which the mobile terminal testing apparatus 1 performs the transmission testing of the mobile terminal 2 is described referring to FIG. 3.

When a function of configuration a parameter is selected with the operation of the input unit 141, for example, the control unit 15 causes the parameter configuration screen to be displayed on the display unit 142, and causes a call connection condition, such as a measurement condition, a channel bandwidth, or a UL channel (frequency), and the like, as parameters for each CC, to be configured (Step S1).

The control unit 15 stores a parameter for every CC, which are configured in a manner that is suitable for an intended testing, for example, in the hard disk device for every CC, and notifies the call processing unit 12 of the parameter in such a manner that the call processing unit can control the CC in accordance with the parameter which is configured by the call processing unit 12.

After the parameter is configured, the mobile terminal testing apparatus 1 and the mobile terminal 2 are connected in a wired manner to each other, location registration is performed by performing an operation, such as powering on the mobile terminal 2, and it is checked whether or not the location registration is normally performed on the mobile terminal testing apparatus 1 side.

When an operation of making a call connection is performed with the operation of the input unit 141 in a state where the location registration is performed, the control unit 15 instructs the call processing unit 12 to make a call connection and provides a state where the call connection is made to the mobile terminal 2 (Step S2).

When an operation of starting measurement for the transmission testing of the mobile terminal 2 is performed with the input unit 141 in a state where the call connection is made (Step S3), the control unit 15 transmits "pre-measurement preparation instruction" to the call processing unit 12 (Step S4).

When receiving "pre-measurement preparation instruction", the call processing unit 12 transmits a control signal to the mobile terminal 2, causes the mobile terminal 2 to perform stopping of UL scheduling (DCI Format 0) of each CC and stopping of DL scheduling (DCI Format 1/1A or the like) of each CC, and causes the mobile terminal 2 to be in the state where the user data of the uplink signal is not transmitted (Step S5).

When transmitting the control signal to the mobile terminal 2, the call processing unit 12 transmits "pre-measurement preparation completion" to the control unit 15 (Step S6).

When receiving "pre-measurement preparation completion" from the call processing unit 12, the control unit 15 transmits "pre-measurement preparation instruction" to the wireless signal measurement unit 13 (Step S7).

When receiving "pre-measurement preparation instruction", the wireless signal measurement unit 13 performs LO frequency detection processing that will be described below referring to FIG. 4 (Step S8), stores a detected LO frequency, and transmits "pre-measurement preparation completion" to the control unit 15 (Step S9).

When receiving "pre-measurement preparation completion" from the wireless signal measurement unit 13, the control unit 15 transmits "pre-measurement preparation instruction 2" to the call processing unit 12 (Step S10).

When receiving "pre-measurement preparation instruction 2", the call processing unit 12 transmits a control signal to the mobile terminal 2, causes the mobile terminal 2 to perform transmission of the UL scheduling (DCI Format 0) of each CC and transmission of the DL scheduling (DCI Format 1/1A or the like) of each CC, and causes the mobile terminal 2 to perform transmission control in accordance with a condition that is indicated by the configured parameter (Step S11).

When transmitting the control signal to the mobile terminal 2, the call processing unit 12 transmits "pre-measurement preparation completion 2" to the control unit 15 (Step S12).

When receiving "pre-measurement preparation completion 2" from the call processing unit 12, the control unit 15 transmits "measurement starting instruction" to the wireless signal measurement unit 13 (Step S13).

When receiving "measurement starting instruction", the wireless signal measurement unit 13, for example, performs measurement of EVM or carrier leakage on the PCC or the SCC, using the LO frequency that is stored, based on details of reception testing that are included in "measurement starting instruction" (Step S14), and when measurement of a reception signal is ended, transmits "measurement result report" to the control unit 15 (Step S15).

When receiving "measurement result report" from the wireless signal measurement unit 13, the control unit 15 causes measurement result information and the like to be displayed on the display unit 142 (Step S16). The measurement result information and the like are included in "measurement testing result report".

Figure 4:
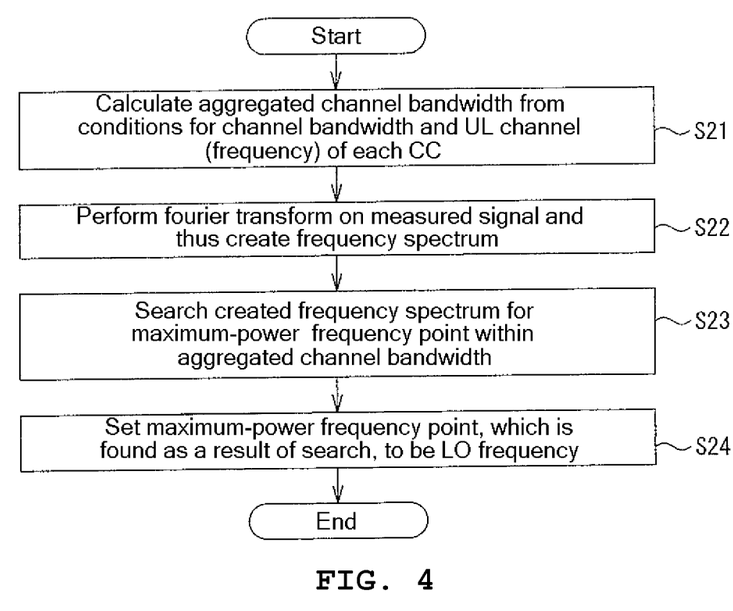
FIG. 4 is a flowchart illustrating an LO frequency detection processing procedure in the mobile terminal testing apparatus according to one embodiment of the present invention.

Next, the LO frequency detection processing is described referring to a flowchart in FIG. 4. First, the wireless signal measurement unit 13 calculates an aggregated channel bandwidth that is a frequency bandwidth in which the PCC and SCC that are configured as the uplink carrier aggregation are contiguous, from conditions for a channel bandwidth and UL channel (frequency) of each CC in the uplink carrier aggregation (Step S21).

At this point, a spurious within an aggregated channel bandwidth in a state where the uplink signal is not transmitted from the mobile terminal 2 is referred to as a measured signal. The wireless signal measurement unit 13 performs Fourier transform on the measured signal, and thus creates a frequency spectrum (Step S22).

The wireless signal measurement unit 13 searches the created frequency spectrum for the maximum power frequency point within the aggregated channel bandwidth (Step S23).

The wireless signal measurement unit 13 sets the maximum-power frequency point, which is found as a result of the search, to be the LO frequency (Step S24). In a case where one maximum-power frequency point is present for every band of each CC, each frequency point is set to be the LO frequency of each CC (this is a case in FIG. 2A).

Figure 5:
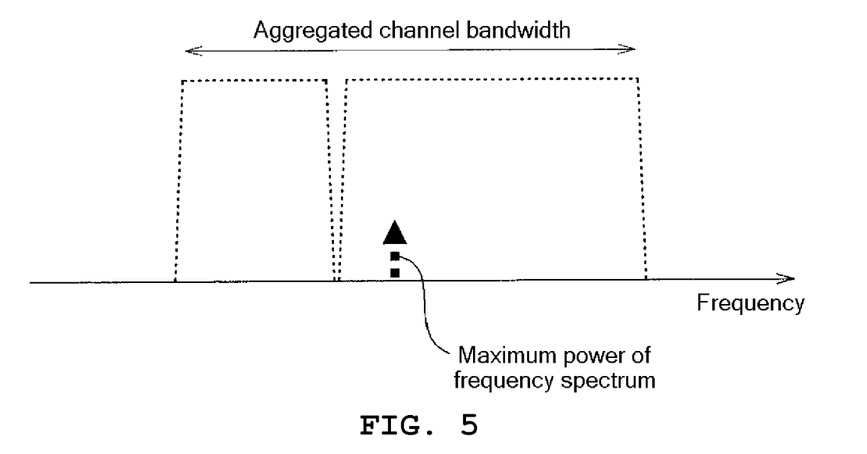
FIG. 5 is a diagram illustrating a detection image of an LO frequency of the mobile terminal testing apparatus according to one embodiment of the present invention.

An image of the frequency spectrum that is created in this processing is illustrated in FIG. 5. As illustrated in FIG. 5, the maximum-power frequency point in a case where the frequency band is the aggregated channel bandwidth is set to be the LO frequency. FIG. 5 is a case where the LO frequency is retained in the center of the frequency band in which the PCC and the SCC are contiguous, which is illustrated in FIG. 2B.

Because a state where the user data is unavailable for transmission is created in this manner, the leaked LO frequency can be detected.

According to another aspect of the present embodiment, the control unit 15 causes the call processing unit 12 to establish a connection for the intra-band contiguous CA in uplink between the mobile terminal testing apparatus 1 and the mobile terminal 2. The control unit 15 causes the call processing unit 12 to transmit a prescribed control signal to the mobile terminal 2, and thus the mobile terminal 2 transmits the user data, thereby providing a state where the user data is caused to have a deviation in a transmission spectrum. In this state, the control unit 15 causes the wireless signal measurement unit 13 to detect the LO frequency.

The wireless signal measurement unit 13 creates a frequency spectrum in a frequency band in which the intra-band contiguous CAs are contiguous, detects a signal for the user data and an image signal for the signal, which are transmitted in the created frequency spectrum, and sets the maximum-power frequency point, which is midway between the signal for the user data and the image signal for the signal that are transmitted, to be the LO frequency.

Figure 6:
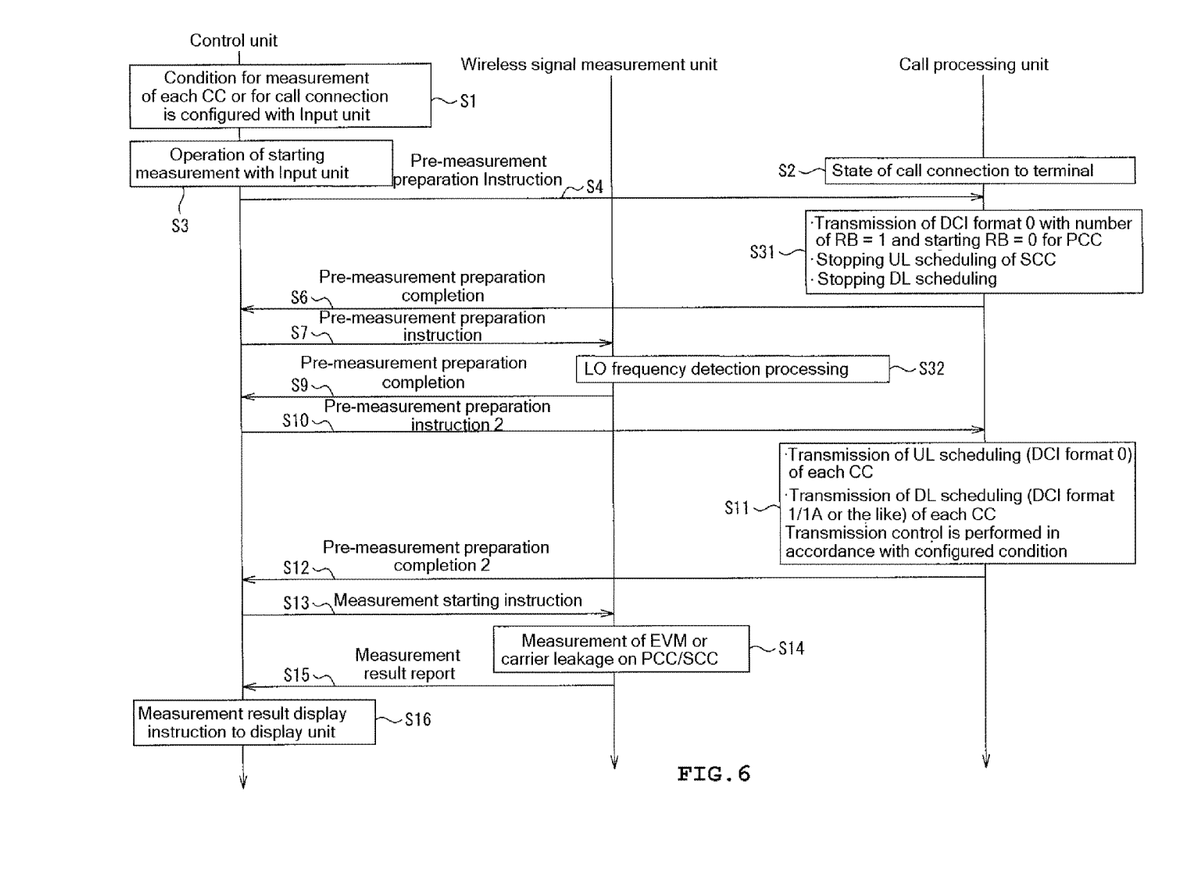
FIG. 6 is a sequence diagram illustrating a testing procedure for uplink carrier aggregation of a mobile terminal testing apparatus according to another aspect of one embodiment of the present invention.

A procedure in which the mobile terminal testing apparatus 1 performs the transmission testing of the mobile terminal 2 is described referring to FIG. 6. Moreover, FIG. 6 illustrates that processing that is given the same step number as in FIG. 2 is the same processing in FIG. 2.

As is the case with the embodiment describe above, the control unit 15 causes the call connection condition, such as the measurement condition, the channel bandwidth, or the UL channel (frequency), and the like, as the parameters for each CC, to be configured (Step S1). Subsequently, when, with the operation of the input unit 141, the user performs the operation of making a call connection, the control unit 15 transmits an instruction for the call connection to the call processing unit 12 that corresponds to the CC which is designated by the user, and causes the call connection to be made (Step S2). Subsequently, when the operation of starting the transmission testing of the mobile terminal 2 is performed with the operation of the input unit 141 by the user (Step S3), the control unit 15 transmits "pre-measurement preparation instruction" to the call processing unit 12 (Step S4).

When receiving "pre-measurement preparation instruction", the call processing unit 12 transmits the control signal to the mobile terminal 2, and thus causes the mobile terminal 2 to perform the transmission of DCI format 0 with number of RB=1 and starting RB=0 for the PCC, the stopping of the UL scheduling (DCI format 0) of the SCC, and the stopping of the DL scheduling (DCI Format 1/1A or the like) and to transmit the user data, thereby providing a state where the uplink signal is caused to have a deviation in the transmission spectrum (Step S31).

Subsequently, as is the case with the embodiment described above, when transmitting the control signal to the mobile terminal 2, the call processing unit 12 transmits "pre-measurement preparation completion" to the control unit 15 (Step S6), and when receiving "pre-measurement preparation completion", the control unit 15 transmits "pre-measurement preparation instruction" to the wireless signal measurement unit 13 (Step S7).

When receiving "pre-measurement preparation instruction", the wireless signal measurement unit 13 performs the LO frequency detection processing that will be described below referring to FIG. 7 (Step S32), stores the detected LO frequency, and transmits "pre-measurement preparation completion" to the control unit 15 (Step S9).

Subsequently, as is the case with the embodiment described above, when receiving "pre-measurement preparation completion" from the wireless signal measurement unit 13, the control unit 15 transmits "pre-measurement preparation instruction 2" to the call processing unit 12 (Step S10), and when receiving "pre-measurement preparation instruction 2", the call processing unit 12 transmits the control signal to the mobile terminal 2. Thus, the mobile terminal 2 is caused to perform the transmission of the UL scheduling (DCI Format 0) of each CC and the transmission of the DL scheduling (DCI Format 1/1A or the like) of each CC, and the mobile terminal 2 is caused to perform the transmission control in accordance with the condition that is indicated by the configured parameter (Step S11).

When transmitting the control signal to the mobile terminal 2, the call processing unit 12 transmits "pre-measurement preparation completion 2" to the control unit (Step S12), and when receiving "pre-measurement preparation completion 2", the control unit 15 transmits "measurement starting instruction" to the wireless signal measurement unit 13 (Step S13).

When receiving "measurement starting instruction", the wireless signal measurement unit 13, for example, performs measurement of EVM or carrier leakage on the PCC or the SCC, using the LO frequency that is stored, based on details of reception testing that are included in "measurement starting instruction" (Step S14), and when measurement of a reception signal is ended, transmits "measurement result report" to the control unit 15 (Step S15).

When receiving "measurement result report" from the wireless signal measurement unit 13, the control unit 15 causes the measurement result information and the like to be displayed on the display unit 142 (Step S16). The measurement result information and the like are included in "measurement testing result report".

Figure 7:
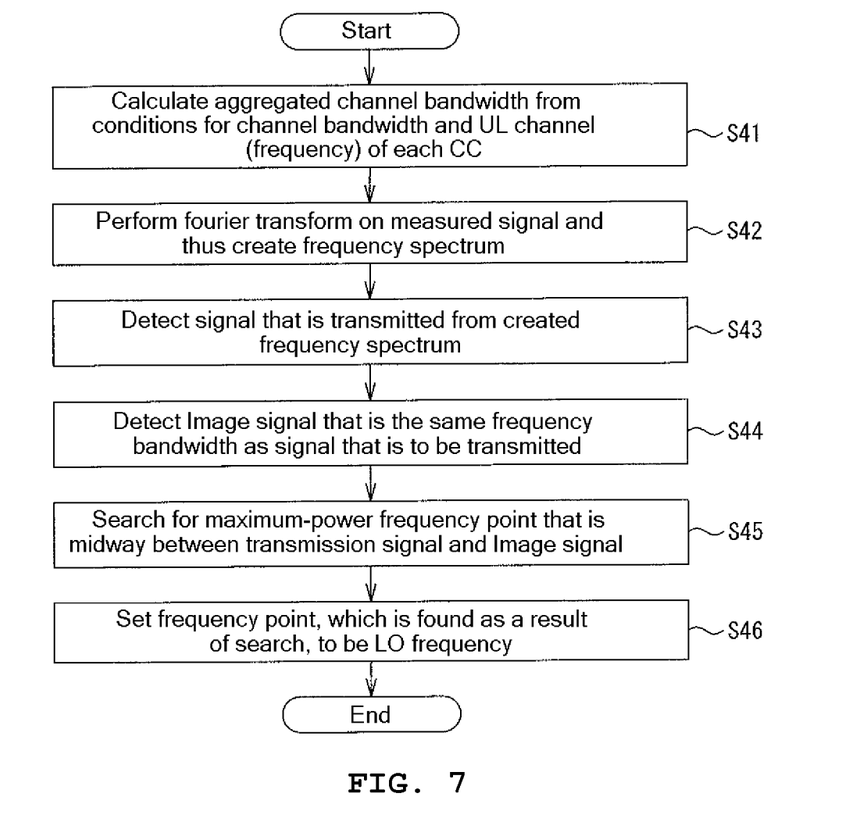
FIG. 7 is a flowchart illustrating an LO frequency detection processing procedure in the mobile terminal testing apparatus according to another aspect of one embodiment of the present invention.

Next, the LO frequency detection processing is described referring to a flowchart in FIG. 7. First, the wireless signal measurement unit 13 calculates the aggregated channel bandwidth that is a frequency bandwidth in which the PCC and SCC that are configured as the uplink carrier aggregation are contiguous, from the conditions for the channel bandwidth and the UL channel (frequency) of each CC in the uplink carrier aggregation (Step S41).

The wireless signal measurement unit 13 performs the Fourier transform on the measured signal with the signal received from the mobile terminal 2 being the measure signal, and thus creates the frequency spectrum (Step S42).

The wireless signal measurement unit 13 searches the created frequency spectrum for the signal that is transmitted from within the aggregated channel bandwidth (Step S43). For example, the wireless signal measurement unit 13 configures a high-power signal in a frequency band in the frequency spectrum within the aggregated channel bandwidth, to be the signal that is to be transmitted.

The wireless signal measurement unit 13 detects the image signal that is in the same frequency band as the detected signal that is to be transmitted (Step S44). For example, the wireless signal measurement unit 13 acknowledges as the image signal a signal in a frequency band, which has lower power than the detected signal, and which is in the same bandwidth as the signal that is detected from the frequency spectrum within the aggregated channel bandwidth.

The wireless signal measurement unit 13 searches for the maximum-power frequency point that is midway between the signal that is transmitted and the image signal (Step S45).

The wireless signal measurement unit 13 sets the maximum-power frequency point, which is found as a result of the search, to be the LO frequency (Step S46).

In a case where the maximum-power frequency point is present in a center frequency of the PCC, the wireless signal measurement unit 13 estimates that the LO frequency is present in the center frequency of each of the PCC and SCC (this is a case in FIG. 2A). In this case, the LO frequency may be detected in the same manner as for the SCC, and the center frequency of the SCC may be set to be the LO frequency.

In a case where the maximum-power frequency point is present in the center frequency of the aggregated channel bandwidth, the wireless signal measurement unit 13 estimates that the LO frequency is present in the center frequency of the aggregated channel bandwidth (this is a case in FIG. 2B).

In a case where the maximum-power frequency point is present in a frequency domain in a guard band between the PCC and the SCC, the wireless signal measurement unit 13 estimates that the LO frequency is present in the guard band between the PCC and the SCC (this is a case FIG. 2C).

Figure 8:
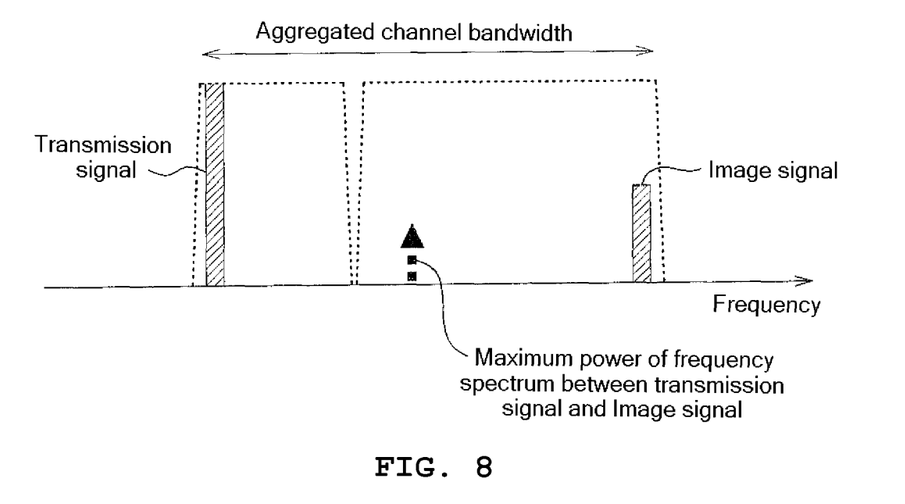
FIG. 8 is a diagram illustrating a detection image of an LO frequency of the mobile terminal testing apparatus according to another aspect of one embodiment of the present invention.

An image of the frequency spectrum that is created in this processing is illustrated in FIG. 8. As illustrated in FIG. 8, the maximum-power frequency point that is midway between the transmission signal and the image signal in a case where the frequency band is the aggregated channel bandwidth is set to be the LO frequency. FIG. 8 is a case where the LO frequency is retained in the center of the frequency band in which the PCC and the SCC are contiguous, which is illustrated in FIG. 2B.

In this manner, because the signal of which the user data is caused to have the deviation in the transmission spectrum is transmitted, the LO frequency can be detected from the signal and the image signal for the signal.

As described above, according to the embodiment described above, the mobile terminal 2 is caused to transmit a signal in a state where the signal for the user data is not present, and the maximum-power frequency point in the frequency spectrum of the reception signal is set to be the LO frequency.

Accordingly, when the LO frequency that is leaked in the state where the signal for the user data is not present is detected, although specifications for or a hardware constitution of the mobile terminal 2 is not known, the measurement of the transmission signal of the mobile terminal 2 can be precisely performed.

Furthermore, the mobile terminal 2 is caused to transmit the user data and thus the user data is caused to have the deviation in the transmission spectrum. Furthermore, the signal for the user data and the image signal for the signal are detected from the reception signal, and the maximum-power frequency point that is midway between the signal and the image signal is set to be the LO frequency.

Accordingly, when the LO frequency is detected from a relationship from the signal for the user data and the image signal for the signal, although the specifications for and the hardware constitution of the mobile terminal 2 are not know, the measurement of the transmission signal of the mobile terminal 2 can be precisely performed.

The embodiment of the present invention is disclosed, and it is apparent to a person of ordinary skill in the related art that modifications to the embodiment are possible within the scope that does not depart from the nature and gist of the present invention. All of these modifications and equivalents are intended to fall within the scope of the following claims.

DESCRIPTION OF REFERENCE NUMERALS AND SIGNS

1 MOBILE TERMINAL TESTING APPARATUS
2 MOBILE TERMINAL
10 WIRELESS SIGNAL PROCESSING UNIT
11 WIRELESS HARDWARE CONTROL UNIT
12 CALL PROCESSING UNIT
13 WIRELESS SIGNAL MEASUREMENT UNIT
14 USER INTERFACE UNIT
15 CONTROL UNIT
141 INPUT UNIT
142 DISPLAY UNIT

What is claimed is:

1. A mobile terminal testing apparatus that, based on a parameter that is configured for each of multiple component carriers in carrier aggregation, sets one of the multiple component carriers to be a primary component carrier, sets the other component carriers to be a secondary component carrier, makes a call connection to a mobile terminal, and thus performs testing of the carrier aggregation, the mobile terminal testing apparatus comprising a processor configured to:

make the call connection between the mobile terminal testing apparatus itself and the mobile terminal and control a condition for transmitting a transmission signal of the mobile terminal;

receive from the mobile terminal a signal which is set to be a prescribed transmission condition and detect a local oscillation frequency of the mobile terminal from the received signal;

wherein, in a case where testing of uplink carrier aggregation that is a frequency arrangement in which a primary component carrier and a secondary component carrier in uplink are contiguous within a frequency band is performed, the processor performs configuration for the mobile terminal in such a manner that the signal which is transmitted by the mobile terminal is set to be the prescribed transmission condition, and the local oscillation frequency is detected from the frequency band in which the primary component carrier and the secondary component carrier in the uplink are contiguous, using the signal that is set to be the prescribed transmission condition, which is received from the mobile terminal; and wherein the processor is further configured to perform configuration for the mobile terminal in such a manner that the mobile terminal is caused to transmit user data and thus a state is provided where the user data is caused to have a deviation in a transmission spectrum, and to detect a transmission signal for the user data transmitted by the mobile terminal and an image signal for the transmission signal, which are in the frequency band in which the primary component carrier and the secondary component carrier in the uplink are contiguous, and set a maximum-power frequency point that is midway between the transmission signal and the image signal, to be the local oscillation frequency.

2. The mobile terminal testing apparatus according to claim 1, wherein the processor is further configured to measure prescribed performance of the uplink carrier aggregation that is the frequency arrangement in which the primary component carrier and the secondary component carrier in the uplink are contiguous, using information on a position of the detected local oscillation frequency.

3. A mobile terminal testing apparatus that, based on a parameter that is configured for each of multiple component carriers in carrier aggregation, sets one of the multiple component carriers to be a primary component carrier, sets the other component carriers to be a secondary component carrier, makes a call connection to a mobile terminal, and thus performs testing of the carrier aggregation, the mobile terminal testing apparatus comprising a processor configured to:

make the call connection between the mobile terminal testing apparatus itself and the mobile terminal and control a condition for transmitting a transmission signal of the mobile terminal;

receive from the mobile terminal a signal which is set to be a prescribed transmission condition and detect a local oscillation frequency of the mobile terminal from the received signal; and wherein, in a case where testing of uplink carrier aggregation that is a frequency arrangement in which a primary component carrier and a secondary component carrier in uplink are contiguous within a frequency band is performed, the processor performs configuration for the mobile terminal in such a manner that the signal which is transmitted by the mobile terminal is set to be the prescribed transmission condition, and the local oscillation frequency is detected from the frequency band in which the primary component carrier and the secondary component carrier in the uplink are contiguous, using the signal that is set to be the prescribed transmission condition, which is received from the mobile terminal, wherein the processor is further configured to perform configuration for the mobile terminal in such a manner that the mobile terminal is caused to transmit user data and thus a state is provided where the user data is caused to have a deviation in a transmission spectrum, and to detect a transmission signal for the user data transmitted by the mobile terminal and an image signal for the transmission signal, which are in the frequency band in which the primary component carrier and the secondary component carrier in the uplink are contiguous, and, in a case where a maximum-power frequency point is in a vicinity of a center frequency of the primary component carrier, estimates that the local oscillation frequency is present in the center frequency of the primary component carrier and in a center frequency of the secondary component carrier.

4. The mobile terminal testing apparatus according to claim 3, wherein the processor is further configured to measure prescribed performance of the uplink carrier aggregation that is the frequency arrangement in which the primary component carrier and the secondary component carrier in the uplink are contiguous, using information on a position of the detected local oscillation frequency.

5. A mobile terminal testing apparatus that, based on a parameter that is configured for each of multiple component carriers in carrier aggregation, sets one of the multiple component carriers to be a primary component carrier, sets the other component carriers to be a secondary component carrier, makes a call connection to a mobile terminal, and thus performs testing of the carrier aggregation, the mobile terminal testing apparatus comprising a processor configured to:

make the call connection between the mobile terminal testing apparatus itself and the mobile terminal and control a condition for transmitting a transmission signal of the mobile terminal;

receive from the mobile terminal a signal which is set to be a prescribed transmission condition and detect a local oscillation frequency of the mobile terminal from the received signal;

wherein, in a case where testing of uplink carrier aggregation that is a frequency arrangement in which a primary component carrier and a secondary component carrier in uplink are contiguous within a frequency band is performed, the processor performs configuration for the mobile terminal in such a manner that the signal which is transmitted by the mobile terminal is set to be the prescribed transmission condition, and the local oscillation frequency is detected from the frequency band in which the primary component carrier and the secondary component carrier in the uplink are contiguous, using the signal that is set to be the prescribed transmission condition, which is received from the mobile terminal, and wherein the processor is further configured to perform configuration for the mobile terminal in such a manner that the mobile terminal is caused to transmit user data and thus a state is provided where the user data is caused to have a deviation in a transmission spectrum, and to detect a transmission signal for the user data transmitted by the mobile terminal and an image signal for the transmission signal, which are in the frequency band in which the primary component carrier and the secondary component carrier in the uplink are contiguous, and, in a case where a maximum-power frequency point is present in a frequency domain of a guard band between the primary component carrier and the secondary component carrier, estimates that the local oscillation frequency is present in the guard band.

6. The mobile terminal testing apparatus according to claim 5, wherein the processor is further configured to measure prescribed performance of the uplink carrier aggregation that is the frequency arrangement in which the primary component carrier and the secondary component carrier in the uplink are contiguous, using information on a position of the detected local oscillation frequency.

* * * * *